US007403990B2

(12) United States Patent
Nishiyama et al.

(10) Patent No.: US 7,403,990 B2
(45) Date of Patent: Jul. 22, 2008

(54) INFORMATION DISTRIBUTION SYSTEM (75) Inventors: Yoko Nishiyama, Kanagawa (JP); Katsumi Kanasaki, Tokyo (JP); Hiroko Mano, Tokyo (JP); Masayuki Kameda, Kanagawa (JP); Masumi Narita, Tokyo (JP); Masako Hirose, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 876 days.

(21) Appl. No.: 10/430,410

(22) Filed: May 7, 2003

(65) Prior Publication Data
US 2003/0233441 A1 Dec. 18, 2003

(30) Foreign Application Priority Data
May 8, 2002 (JP) ............... 2002-133232

(51) Int. Cl.
*G06F 15/173* (2006.01)
(52) U.S. Cl. ............... 709/223; 709/240; 709/241; 709/253
(58) Field of Classification Search ........... 709/223, 709/240, 241; 790/241
See application file for complete search history.

(56) References Cited

U.S. PATENT DOCUMENTS

| 7,133,862 B2 * | 11/2006 | Hubert et al. ............... 707/3 |
| 2002/0147646 A1 * | 10/2002 | Ogura et al. ............... 705/14 |
| 2003/0163815 A1 * | 8/2003 | Begeja et al. ............... 725/46 |
| 2004/0158739 A1 * | 8/2004 | Wakai et al. ............... 713/200 |
| 2005/0055641 A1 * | 3/2005 | Machida ............... 715/734 |
| 2006/0107088 A1 * | 5/2006 | Katayama et al. ............... 714/4 |
| 2006/0212602 A1 * | 9/2006 | Fukasawa et al. ............... 709/248 |

FOREIGN PATENT DOCUMENTS

| JP | 11-45284 | 2/1999 |
| JP | 11-66081 | 3/1999 |
| JP | 2000-105764 | 4/2000 |
| JP | 2001-160067 | 6/2001 |
| JP | 2001-350786 | 12/2001 |

* cited by examiner

Primary Examiner—John Follansbee
Assistant Examiner—Nghi V Tran
(74) Attorney, Agent, or Firm—Dickstein Shapiro LLP (57) ABSTRACT

An information distribution system is provided that can distribute various types of information without imposing extra workload on users. This information distribution system includes a server device that can access a profile DB and an information source DB. This server device includes an operation history recorder, a feature extractor, a profiler, an information collector, and an information distributor. Every time a user operates an information device, the server device obtains the operation history of the user. The operation history contains the user ID, the types of operations, and the text information of the handled document. The server device then linguistically analyzes the text information to extract the feature information. After performing weighting on the feature information, the server device registers the feature information in the profile DB. The server device then obtains information from the information source DB, and extracts the profile corresponding to the information from the profiles registered in the profile DB. The server device then distributes the information to the user having the extracted profile.

3 Claims, 6 Drawing Sheets

INFORMATION DISTRIBUTION SYSTEM

BACKGROUND OF THE INVENTION

1. Field of the Invention

The present invention relates to an information distribution system, and, more particularly, to an information distribution system that detects information needs of users from the usage histories of information devices such as a printer and a copying machine, collects information that meets the needs from information sources, and then distributes the collected information to the users.

2. Description of the Related Art

In an office environment, it is necessary to identify users who need information to be uploaded to the Internet or an internal document control server, for example, and to timely distribute the information to the identified users. In a conventional method, the information distribution is performed in the following manner:

1) each user inputs the category and keyword of information he/she needs to acquire, and adds the category and keyword to his/her own profile registered in the system; and
2) if new information is uploaded, the system searches for the corresponding profile, and distributes the new information to the user having the profile.

However, there are several problems with the conventional system that manually produces and corrects the profiles of users. The problems include:

1) the keyword input imposes additional workload on each user;
2) users might not be able to remember the appropriate keyword for their information needs; and
3) when the information needs to be changed, the change is not reflected in the system unless the user manually corrects his/her profile.

Japanese Laid-Open Patent Application No. 2000-105764 discloses a system that produces each new user profile based on document information that has been determined to be suitable for producing a profile by the user, stores and controls the relationships among user profiles, and displays document information that constantly reflects changes of the interests of the users. Also, Japanese Laid-Open Patent Application No. 2001-160067 discloses a Web recommended article notifying service system. In this system, the similarity between each user profile and an article is calculated, identified, and analyzed, by more than one method. In generating each profile, the history of the user reading documents is fed back to the profile. Japanese Laid-Open Patent No. 2001-350786 discloses a system and method (a marketing support system and method) of analyzing electronic documents produced by users, when generating profiles of the users. By doing so, incorrectness in the profiles can be avoided, and the workload of constructing profiles can be reduced.

Further, Japanese Laid-Open Patent Application No. 11-66081 discloses a profile acquiring system, an information providing system, a profile acquiring method, and a profile acquiring medium. In this disclosure, documents that have been produced, read, or quoted by each user, are utilized to acquire the profile of the user. Also, Japanese Laid-Open Patent Application No. 11-45284 discloses a profile producing method, and a computer-readable recording medium on which a program for performing the procedures of the method with a computer is recorded. In this disclosure, the search conditions set by users and the search results are utilized to produce the profiles of the users.

All of the above prior art disclosures are aimed at automatically generating profiles, though the information acquiring means on which the automatic profile generation is based are different among the prior art disclosures. Still, the conventional information acquiring means do not include office information devices, such as printers, copying machines, scanners, facsimile machines, and digital multifunction peripherals. As a person uses a printer to print out a document, or a copying machine to obtain a duplicate copy of the document, the operation history has relevance to the person and the information contained in the document. For instance, when a user prints out copies of reference material to be distributed at a business meeting, the information contained in the reference material is the information necessary to the user and his/her work. Also, when a user makes a duplicate copy of a monograph, the information contained in the document (the monograph) is the information that the user is interested in.

SUMMARY OF THE INVENTION

A general object of the present invention is to provide an information distribution system in which the above disadvantages are eliminated.

A more specific object of the present invention is to provide an information distribution system that automatically generates and corrects profiles, utilizing the usage histories of information devices used by users, and distributes various types of information to the users, without imposing extra workload on the users.

The above objects of the present invention are achieved by an information distribution system that includes: a server device that distributes information to users, and information devices that are used by the users and are connected to the server device via a network. In this information distribution system, the server device includes: an operation history recorder that is connected to terminal devices used by the users, can have access to a profile DB that registers profile information relating to the users, and records operation history of each of the users, the operation history containing a plurality of items of information including the ID information of the user who has operated one of the information devices, the operation date and time, the type of operation, and the text information of the handled document; a feature extractor that extracts feature information based on the recorded text information; a profiler that performs weighting on the extracted feature information, adds the weighted feature information to the profile information of the corresponding user, and registers the profile information including the weighted feature information in the profile DB; an information collector that collects various types of information; and an information distributor that extracts the profile information corresponding to the collected information from all the profile information registered in the profile DB, and distributes the collected information to users to whom the extracted profile information relates.

In this information distribution system, the server device may further include a reading history recorder that records a reading history of each user when the user reads the information distributed by the information distributor, the reading history containing a plurality of items of information including the ID information of the user, the reading date and time, the reading period of time, and the text information of the read information. Here, the feature extractor extracts feature information based on the text information recorded by the reading history recorder, and the profiler performs weighting on the extracted feature information, and corrects the profile information of the user based on the weighted feature information.

In this information distribution system, the feature extractor may extract feature information through linguistic analysis conducted on the text information recorded by the operation history recorder, and the profiler performs weighting on the extracted feature information in accordance with the operation history recorded by the operation history recorder, adds the weighted feature information to the profile information of the user, and registers the profile information including the weighted feature information in the profile DB.

In this information distribution system, the feature extractor may extract feature information through linguistic analysis conducted on the text information recorded by the reading history recorder, and the profiler performs weighting on the extracted feature information in accordance with the reading history recorded by the reading history recorder, adds the weighted feature information to the profile information of the user, and registers the profile information including the weighted feature information in the profile DB.

In this information distribution system, the profiler may extract users who have one or more common items of profile information among all the users registered in the profile DB, form a user group with the extracted users, generate a common profile of the user group, and register the generated common profile of the user group in the profile DB.

In this information distribution system, when a new user is added to the user group registered in the profile DB, the profiler may initialize profile information of the new user, utilizing the common profile registered in the profile DB.

The above and other objects, features, and advantages of the present invention will become more apparent from the following detailed description taken in conjunction with the accompanying drawings.

DESCRIPTION OF THE PREFERRED EMBODIMENTS

The following is a description of embodiments of the present invention, with reference to the accompanying drawings.

The present invention provides a system that detects the information needs of users from the usage histories of information device such as a printer and a copying machine (hereinafter referred to as the office equipment), collects various types of information corresponding to the detected information needs from various information sources periodically or every time of obtaining new information, and distributes the information to the corresponding user. This system is aimed at 1) utilizing the usage histories of the office equipment, and 2) automatically generating and correcting the profiles specifying the information needs of users. Accordingly, the information needs of users can be timely detected, without imposing extra workload on the users. Here, the office equipment includes all information devices used in a typical office environment, such as personal computers, printers, copying machines, facsimile machines, scanners, and digital multifunction peripherals.

Figure 1:
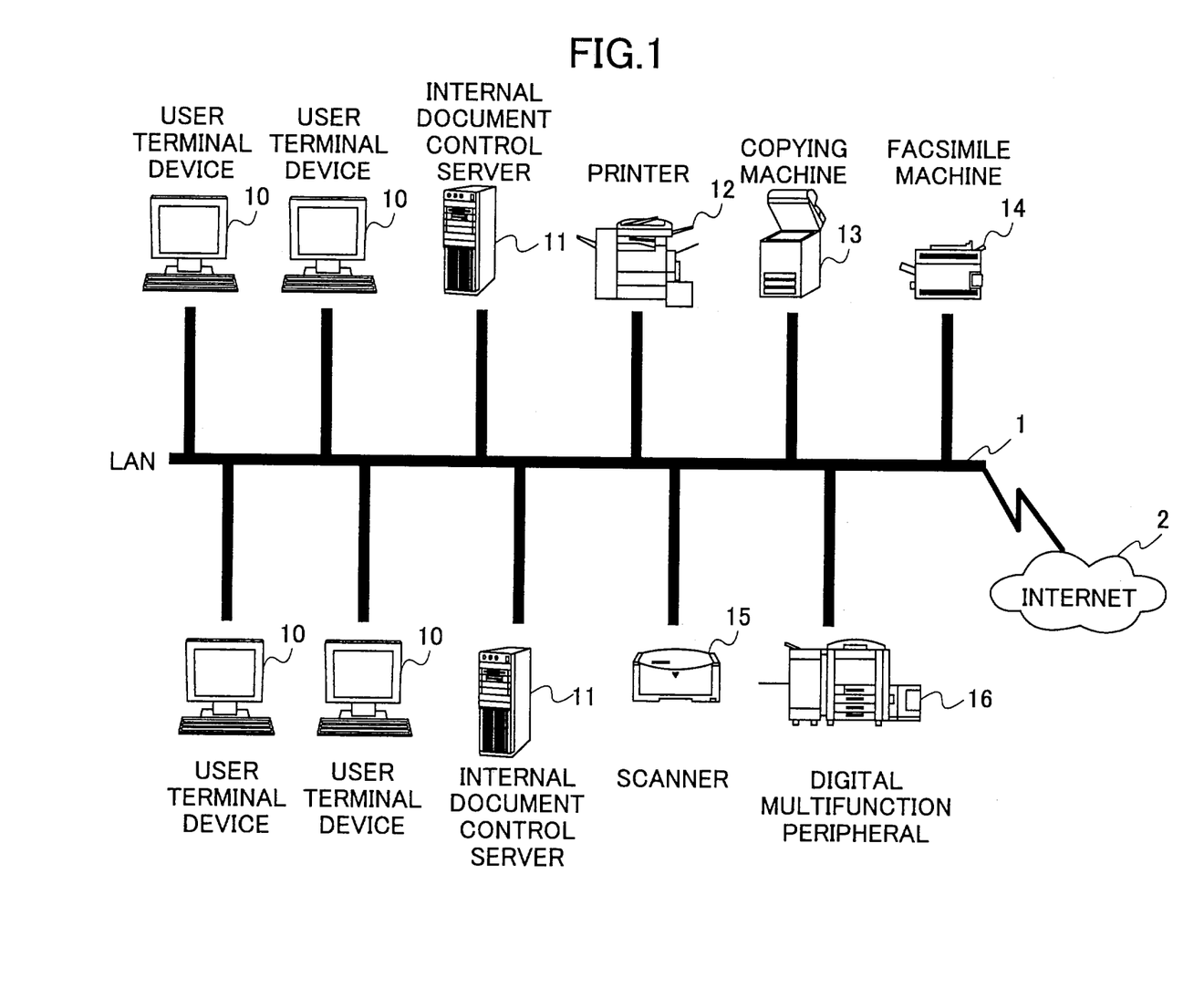
FIG. 1 illustrates an office environment to which the present invention is applied.

FIG. 1 illustrates an example of an office environment to which the present invention is applied. This example includes a LAN 1 constructed within the office, the Internet 2, user terminal devices 10, an internal document control server 11, a printer 12, a coping machine 13, a facsimile machine 14, a scanner 15, and a digital multifunction peripheral 16. In this typical office environment, it is necessary to distribute information that has been uploaded to the Internet 2 or the internal document control server 11, to the terminal devices 10 used by those who requires the information.

Figure 2:
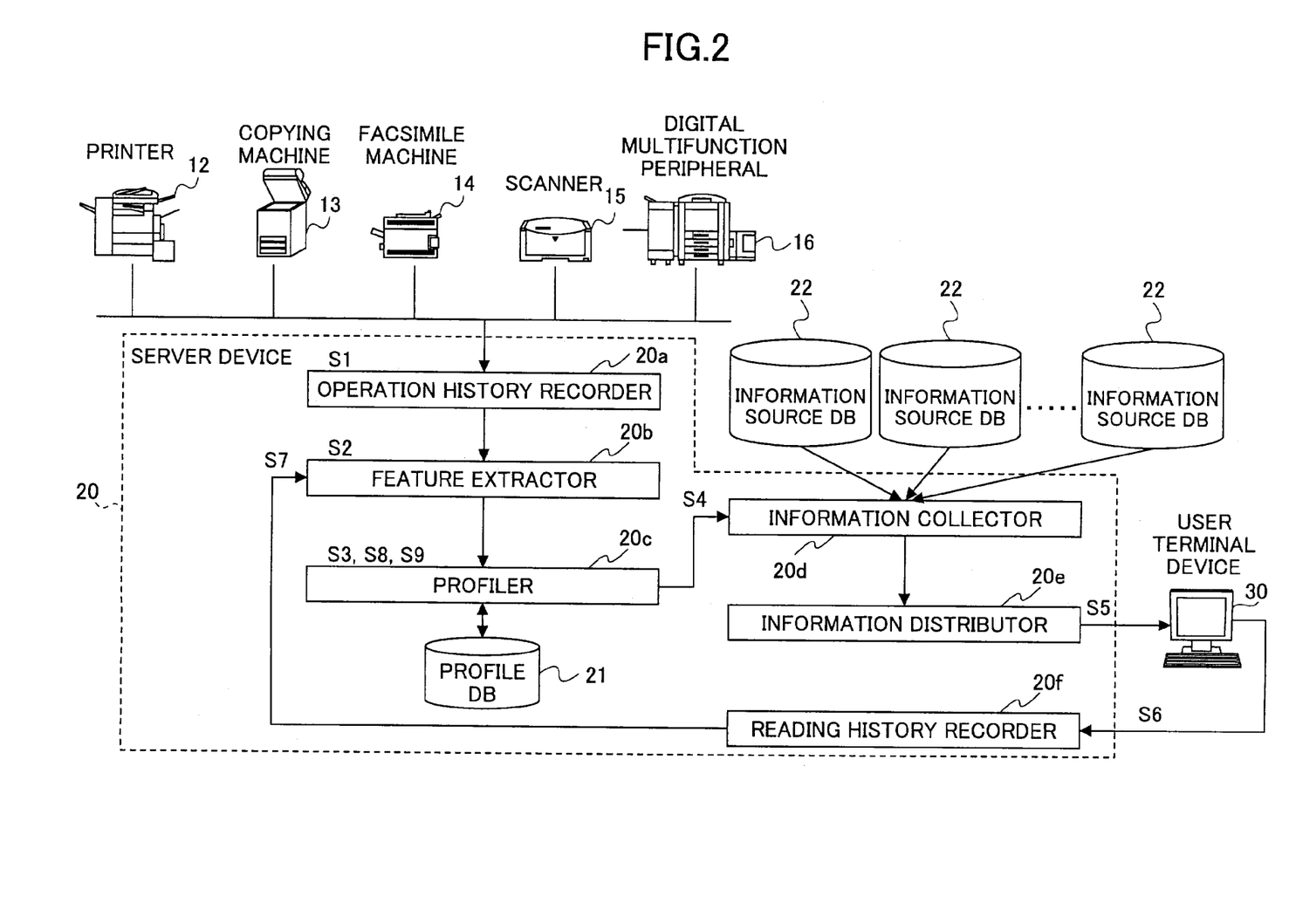
FIG. 2 illustrates an example structure of a module of an information distribution system to which the present invention is applied.

FIG. 2 illustrates an example structure of the module of the information distribution system to which the present invention is applied. This structure includes a server device that distributes information to users, a profile DB that registers profile information relating to the uses, an information source DB that stores various types of information, and user terminal devices 30. The server device 20 includes an operation history recorder 20a, a feature extractor 20b, a profiler 20c, an information collector 20d, an information distributor 20e, and a reading history recorder 20f. In this embodiment, the profile DB 21 is provided at the same location as the server device 20. The location of the server device 20 may be either on the side of the users or on the side of an external service provider that provides information distribution services, as long as the server device is connected to each terminal device and the office equipment via a network. This information distribution system may also be embodied by a structure in which the profile DB 21 is physically contained in the server device 20, or a structure in which the profile DB 21 is connected to the server device 20 via the network but is physically separate from the server device 20. The information source DB 22 stores various types of information on WEB sites and groupware.

The server device 20 of this embodiment is connected to the user terminal device 30 via the network, so as to be able to access the profile DB 21 and the information source DB 22.

The operation history recorder 20a, as shown in the system structure of FIG. 2, records the operation history items shown below, every time a component of the office equipment, such as the printer 12 or the copying machine 13, is used by a user. This operation history recorder 20a may be provided either on the side of the server device 20 or on the side of a component of the office equipment (such as the digital multifunction peripheral 16).

User ID (the ID information of the user (operator))

Date and time (the date and time when the operation such as printing or copying is performed)

Type of operation (such as printing, copying, scanning, or faxing)

Text information of the handled document (in a case of copying, scanning, or faxing, the document is put through an OCR to obtain the text information).

The feature extractor 20b linguistically analyzes the text information obtained through the operation history recorder 20a and the reading history recorder 20f, and extracts feature information. The feature extractor 20b then transfers the feature information to the profiler 20c.

The profiler 20c performs weighting on the feature information extracted by the feature extractor 20b as the information indicating the information needs of the user, in accordance with the appearance frequency of the feature information, the type of operation, and the reading time of the information. The profiler 20c then adds the weighted feature information to the profile of the user, and registers the profile including the weighted feature information in the profile DB 21. The profiler 20c further generates a common profile of the user group from the common contents of the profiles of all the users, and makes corrections in the common profile, if necessary. When a new user is to be added to the user group, the common profile can be used as an initial profile of the new user.

The information collector 20d laterally and periodically collects various types of information from the information source DB 22. Also, every time new information is uploaded to the information source DB 22, the information collector 20d collects the new information. The information collected by the information collector 20d is transferred to the information distributor 20e.

Receiving new information from the information collector 20d, the information distributor 20e detects the corresponding profile(s) from all the registered profiles of the users, and then distributes the new information to all the users having the corresponding profile(s).

Every time a user reads the information distributed from the information distributor 20e, the reading history recorder 20f obtains reading history items shown below, and transfers the reading history items to the feature extractor 20b. The reading history recorder 20f may be provided either on the side of the server device 20 or on the side of the terminal devices 30.

User ID (the ID information of the user)
Date and time (the date and time when the user reads the distributed information)
Reading time (the period of time in which the user reads the distributed information)
Text information of the read information Next, an example of procedures in an information distributing operation performed by the information distribution system shown in FIG. 2 will be described. Every time a user uses the office equipment (including the printer 12, the copying machine 13, the facsimile machine 14, the scanner 15, and the digital multifunction peripheral 16), the server device 20 obtains the operation history of the user (step S1). As already mentioned, this operation history includes the history items: the user ID, the date and time, the type of operation (printing, copying, scanning, or faxing), and the text information of the handled document (in a case of copying, scanning, or faxing, the document is put through an OCR reader to obtain the text information)

The text information is then linguistically analyzed, and the feature information of the document is extracted (step S2). Weighting is performed on the extracted feature information that represents the information needs of the user, in accordance with the appearance frequency of the feature information and the type of operation. The weighted feature information is then added to the profile of the user, and the profile including the weighted feature information is registered in the profile DB 21 (step S3). Every time information is periodically uploaded from the information source DB 22, or new information is uploaded to the information source DB 21, the profile corresponding to the uploaded information is detected from the profiles of all the users registered in the profile DB 21 (step S4). The new information is then distributed to the users having the corresponding profile (step S5).

The server device 20 further obtains the reading history that shows whether each of the users has read the information distributed in step S5 (step S6). As already mentioned, the reading history includes the following information: the user ID, the date and time, the reading time, and the text information of the read information. The text information contained in the reading history is then subjected to natural linguistic processing, so that the feature information is extracted from the text information (step S7). Weighting is then performed on the feature information that represents the information needs of the user, in accordance with the appearance frequency and the reading time of the feature information (step S8). Thus, the profile of the user is corrected.

From the common contents among the profiles of the users, a common profile of the user group is generated and corrected (step S9). To add a new member to the user group, the common profile can be used as the profile of the new member.

In accordance with the present invention, desired information can be automatically distributed, without imposing extra workload on users. Accordingly, the information collecting efficiency is increased. Also, even if a user is not adequately skilled in collecting information or cannot remember appropriate feature information representing a request for desired information, the desired information can be efficiently collected. Furthermore, changes of the information needs of users can be constantly reflected in the system, without imposing extra workload on the users. Through the above advantages, new value can be added to the above types of office equipment.

Figure 3:
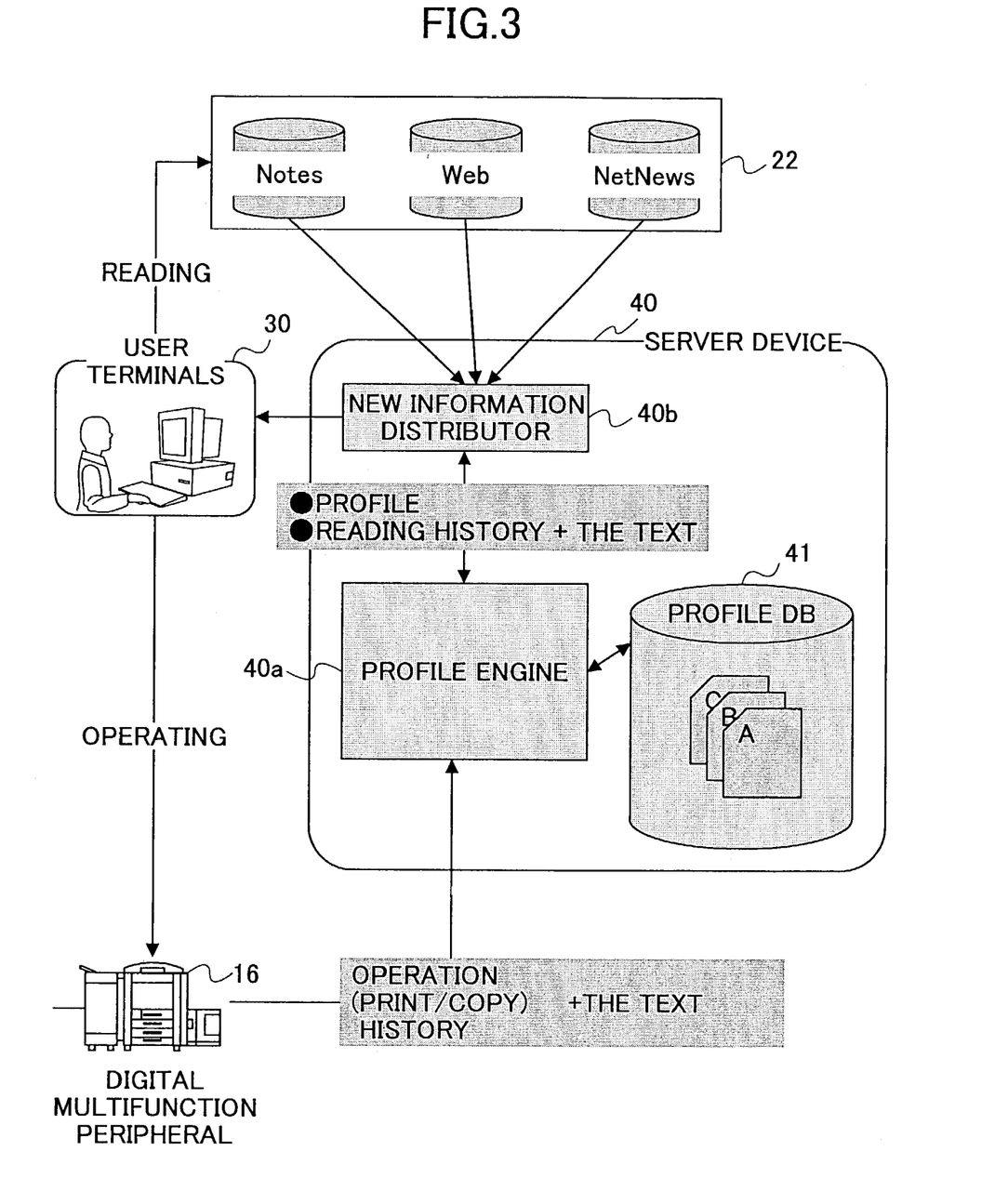
FIG. 3 illustrates a case where an information distribution system is constructed in an office equipped with a digital multifunction peripheral (MFP)

FIG. 3 illustrates a case where an information distribution system is constructed in an office equipped with a digital multifunction peripheral (hereinafter referred to as the MFP). In FIG. 3, reference numeral 40 indicates a server device that distributes information to users. This server device 40 includes a profile engine 40a, a new information distributor 40b, and a profile DB 41 that registers profile information of the users. The server device 40 is connected to the MFP 16 via a network, so as to enable the MFP 16 to access the profile DB 41. A logging operation is first performed by the MFP 16.

Figure 4:
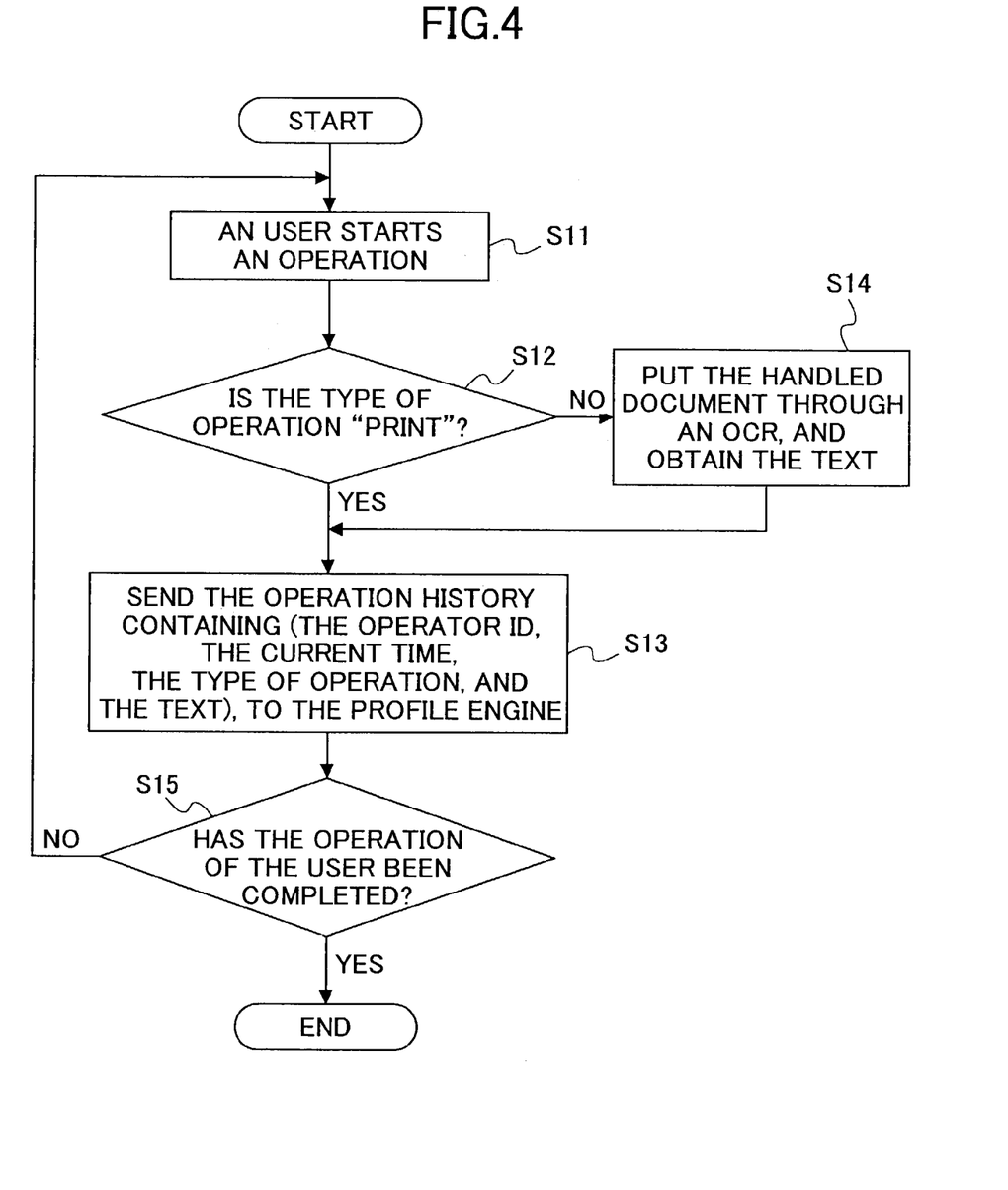
FIG. 4 is a flowchart of a logging operation performed by the MFP.

FIG. 4 is a flowchart of a logging operation performed by the MFP 16. First, when the user of one of the terminal devices 30 operates the MFP 16 (for printing, copying, scanning, faxing, and the like) (step S11), the MFP 16 determines whether the type of the operation is "print" (step S12). If the type of the operation is "print" ("YES" in step S12), the MFP 16 obtains the operation history including the operator ID, the current time, the type of operation, and the text information of the handled document. If the type of the operation is not "print" but is "copy", "scan", or "fax" ("NO" in step S12), the MFP 16 puts the document through an OCR reader, and obtains the text information (step S14). Here, an employee ID card is put through the MFP 16 prior to the operation, so that the operator can be readily identified. The operation history obtained in step S12 is then transferred to the profile engine 40a (step S13). It is then determined whether the operation of the user has been completed (step S15). If the operation has been completed ("YES" in step S15), the operation immediately comes to an end. If the operation has not been completed ("NO" in step S15), the operation returns to step S11, in which the operation with the MFP 16 is continued.

Figure 5:
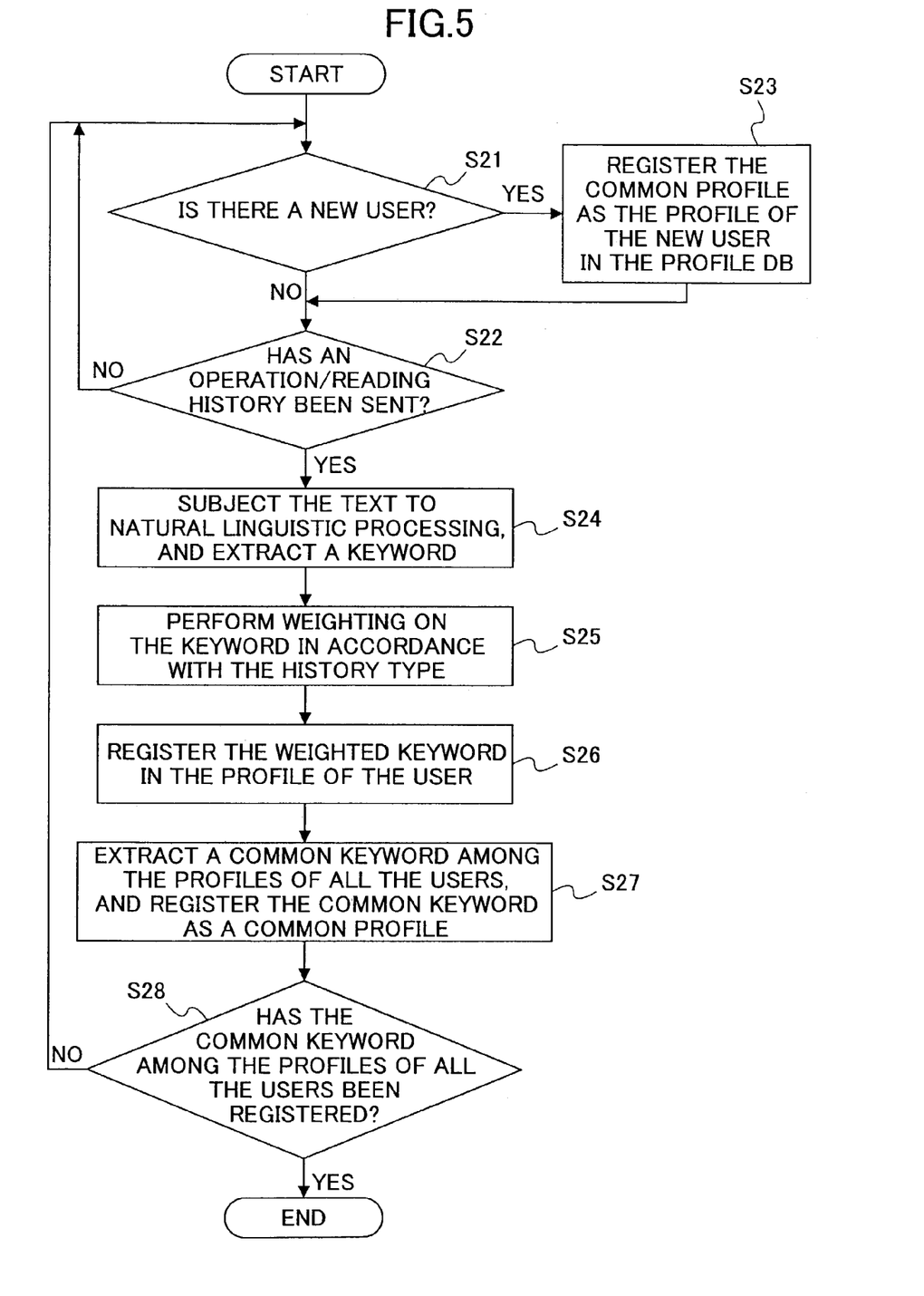
FIG. 5 is a flowchart of an operation performed by the profile engine.

FIG. 5 is a flowchart of an operation performed by the profile engine 40a. The profile engine 40a first determines whether there is a new user to be registered (step S21). If there is a new user to be registered ("YES" in step S21), the profile engine 40a initializes the profile of the new user, utilizing a common user profile described later, and then registers the initialized profile of the new user in the profile DB 21 (step S23). If there is not a new user to be registered ("NO" in step S21), the operation moves on to step S22. The profile engine 40a then determines whether an operation history has been sent from the MFP 16 or a reading history has been sent from the new information distributor 40b (step 22). If neither an operation history nor a reading history has been sent ("NO" in step S22), the operation returns to step S21, in which the history checking is continued. If either an operation history or a reading history has been sent ("YES" in step S22), the obtained text information is subjected to natural linguistic analysis, so that feature information such as a keyword, phrase, or outline information, etc. is extracted (step S24). FIG. 5 only shows "KEYWORD" as a representative example for the feature information.

In step S24, after natural linguistic processing such as morphological analysis is performed on the text information (hereinafter referred to as the "text d" in this embodiment), a keyword ($k_{d1}$, $k_{d2}$, ..., $k_{dn}$) is extracted by a conventional keyword extracting technique. In accordance with the appearance frequency of the extracted keyword, and the type of historical operation (reading, printing, copying, scanning, faxing, and the like), weighting is performed on the extracted keyword (step S25). For example, the weight of the keyword of a read document is set at 10, the weight of the keyword of a printed document is set at 8, the weight of the keyword of a copied document is set at 9, and the weight of the keyword of a faxed document is set at 2. The weights may differ among the users. Finally, the weighted keyword [ ($k_{d1}$, $W_{d1}$), ($k_{d2}$, $W_{d2}$), ..., ($k_{dn}$, $W_{dn}$)] is registered in the profile DB (step S26). At this point, the profile of the user contains the following information: the user ID, (keyword$_1$, weight$_1$,) (keyword$_2$, weight$_2$), ..., and (keyword$_N$, weight$_N$).

In registering the keyword in the profile DB 41, the weighting calculation varies, depending on whether the keyword $k_{di}$ has already been registered in the profile DB 41.

1) In a case where $k_{di}$ has already been registered, and is equal to keyword$_j$:

$$weight_j = W_j + \alpha \times W_{di} \qquad (1)$$

In this case, a portion of the weight of $k_{di}$ is added to the existing weight. Here, $\alpha$ is a predetermined coefficient.

2) In a case where $k_{di}$ is a new keyword:

$$weight_{N+1} = \alpha \times W_{di} \qquad (2)$$

In this case, $k_{di}$ is registered as a new keyword$_{N+1}$.

3) In a case where a keyword $W_k$ that is not included in $\{k_{d1}, k_{d2}, ..., k_{dn}\}$ has been registered in the profile DB:

$$weight_k = W_k - \beta \qquad (3)$$

In this case, the weight of the keyword that is not included in the keywords of the document d but has been registered in the profile DB is reduced by $\beta$.

After the weighted keyword is registered in the profile DB 41 (step S26), the common keyword of the profiles of all the users is extracted, and is registered as a common profile (step S27). Here, the weight of the common keyword is set as the minimum weight of the keywords of the profiles of all the users. It is then determined whether the common keyword of the profiles of all the users has been registered (step S28). If the common keyword has been registered ("YES" in step S28), the operation immediately comes to an end. If the common keyword has not been registered ("NO" in step S28), the operation returns to step S21, and the above described procedures are repeated.

Figure 6:
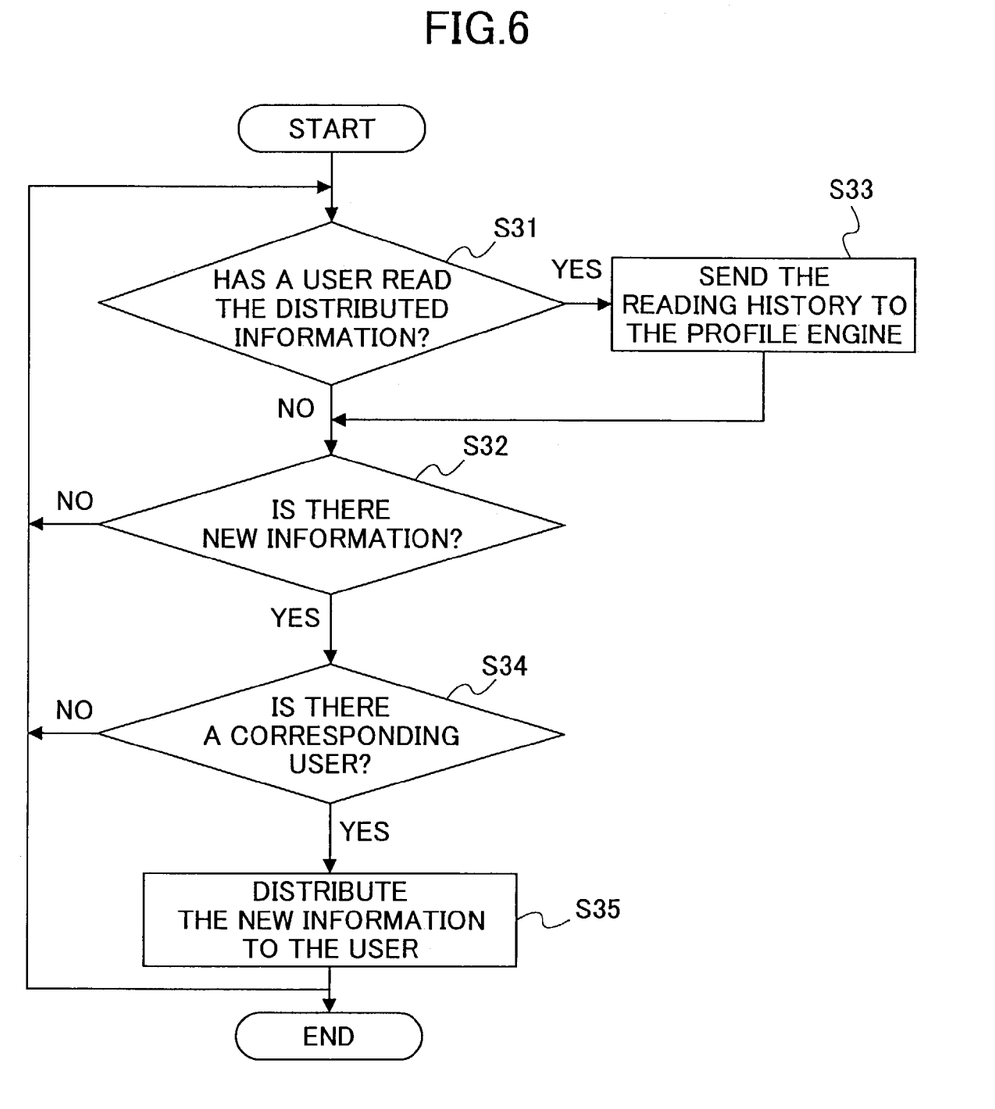
FIG. 6 is a flowchart of an operation performed by the new information distributor.

FIG. 6 is a flowchart of an operation performed by the new information distributor 40b. This new information distributor 40b has the following two functions:
to distribute new information to the user who has requested the distribution of the new information; and
to transfer a reading history to the profile engine 40a, when a piece of distributed information is read.

The new information distributor 40b first monitors the access log of an information source (such as a Web site or the Notes) to determine whether distributed information has been read (step S31). If the distributed information has been accessed (or read) ("YES" in step S31), the new information distributor 40b transfers the reading history (including the user ID, the access time, and the text information of the accessed information) to the profile engine 40a (step S33). If the distributed information has not been accessed (or read) ("NO" in step S31), the operation moves on to step S32.

The new information distributor 40b then monitors the information registration in the information source, so as to determine whether there is new information (step S32). If new information has been registered ("YES" in step S32), the new information distributor 40b searches the profiles registered in the profile DB 41 for the user who has requested the new information (step S34). If the user is found ("YES" in step S34), the new information distributor 40b distributes the new information to the user (step S35). In a case of "NO" in step S32 and step S34, the operation returns to step S31, and the monitoring of the access log is continued. The new information distributor 40b further transfers a read log generated at the time when the distributed information is read by a user, to the profile engine 40a. Based on the read log, the profile engine 40a corrects the profile of each user.

It should be noted that the present invention is not limited to the embodiments specifically disclosed above, but other variations and modifications may be made without departing from the scope of the present invention.

The present application is based on Japanese priority application No. 2002-133232 filed on May 8, 2002 with the Japanese Patent Office, the entire contents of which are hereby incorporated by reference.

What is claimed is:

1. An information distribution system comprising:
a server device that distributes information to a plurality of users and is connected to a plurality of terminal devices used by the users, to have access to a profile DB that registers profile information relating to the user; and
a plurality of information devices that are used by the users and are connected to the server device via a network,
the server device including:
an operation history recorder that records operation history of each of users, the operation history containing at least ID information of the user who has operated one of the information devices, text information of text of a handled document;
a reading history recorder that records a reading history of each user when the user reads the information distributed by the information distributor, the reading history containing at least ID information of the user, a reading period of time, and text information of text of a read document;
a feature exactor that extracts feature information through natural linguistic processing conducted on the text information of text of the document by the operation history recorder, the feature information including at least a keyword extracted from the document;
the feature exactor extracts feature information through natural linguistic processing conducted on the text information of text of the read document recorded by the reading history recorder, the feature information including at least a keyword extracted from the read document;
a profiler that performs weighting on the extracted feature information in accordance with an appearance frequency of the feature information extracted by the feature extractor and the type of operation contained in the operation history recorded by the operation history recorder, adds the weighted feature information to the profile information of the corresponding user, and registers the profile information including the weighted feature information in the profile DB;

the profile performs weighting on the extracted feature information in accordance with the reading history recorded by the reading history recorder, adds the weighted feature information to the profile information of the user, and registers the profile information including the weighted feature information in the profile DB;

an information collector that collects various types of information; and an information distributor that extracts the profile information; corresponding to the collected information from all the profile information registered in the profile DB, and distributes the collected information to users to whom the extracted profile information relates.

2. The information distribution system as claimed in claim 1, wherein the profiler extracts users who have one or more common items in profile information among all the users registered in the profile DB, forms a user group with the extracted users, generates a common profile of the user group, and registers the generated common profile of the user group in the profile DB.

3. The information distribution system as claimed in claim 2, wherein, when a new user is added to the user group registered in the profile DB, the profiler initializes profile information of the new user, utilizing the common profile registered in the profile DB.

* * * * *